under 35 U.S.C. 154(b) by 13 days.

United States Patent
Li et al.

(10) Patent No.: US 10,018,847 B2
(45) Date of Patent: Jul. 10, 2018

(54) METHODS OF VESTIBULO-OCULAR REFLEX CORRECTION IN DISPLAY SYSTEMS

(71) Applicant: HONEYWELL INTERNATIONAL INC., Morris Plains, NJ (US)

(72) Inventors: Xiaohong Linda Li, Plymouth, MN (US); Ken Leiphon, Phoenix, AZ (US); James C. Fye, Scottsdale, AZ (US); Jerry Ball, Peoria, AZ (US); William Ray Hancock, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 13 days.

(21) Appl. No.: 14/925,012

(22) Filed: Oct. 28, 2015

(65) Prior Publication Data

US 2017/0123215 A1    May 4, 2017

(51) Int. Cl.
| | | |
|---|---|---|
| *G02B 27/01* | (2006.01) | |
| *B64D 43/00* | (2006.01) | |
| *G06F 3/01* | (2006.01) | |
| *G06F 3/038* | (2013.01) | |
| *H04N 13/00* | (2018.01) | |

(52) U.S. Cl.
CPC ......... *G02B 27/0179* (2013.01); *B64D 43/00* (2013.01); *G06F 3/012* (2013.01); *G06F 3/013* (2013.01); *G06F 3/038* (2013.01); *H04N 13/00* (2013.01); *G02B 2027/014* (2013.01); *G02B 2027/0181* (2013.01)

(58) Field of Classification Search
None
See application file for complete search history.

(56) References Cited

U.S. PATENT DOCUMENTS

| | | |
|---|---|---|
| 5,742,264 A | 4/1998 | Inagaki et al. |
| 5,966,680 A | 10/1999 | Butnaru |
| 6,497,649 B2 | 12/2002 | Parker et al. |
| 8,690,750 B2 | 4/2014 | Krueger |
| 8,736,692 B1 | 5/2014 | Wong et al. |
| 9,274,599 B1* | 3/2016 | D'Amico ............... G06F 3/013 |
| 2007/0121066 A1* | 5/2007 | Nashner ............. A61B 3/0091 |
| | | 351/210 |

(Continued)

FOREIGN PATENT DOCUMENTS

WO    2015116640 A1    8/2015

OTHER PUBLICATIONS

Ukai, K. et al.; Use of Infrared TV Cameras Built into Head-Mounted Display to Measure Torsional Eye Movements; Jpn J Ophthalmol 45, 5-12 (2001) © 2001 Japanese Ophthalmological Society; Published by Elsevier Science Inc.

(Continued)

*Primary Examiner* — Alexander Eisen
*Assistant Examiner* — Kebede Teshome
(74) *Attorney, Agent, or Firm* — Lorenz & Kopf, LLP

(57) ABSTRACT

A method for displaying images on a head-mounted display (HMD) device that compensates for a user's vestibulo-ocular reflex (VOR) response. The displayed HMD image is compensated for predicted eye position such that the displayed image stays centered on the fovea of the eye, during transient eye movement caused by head motion, resulting in better display readability, discernment and cognitive processing.

2 Claims, 7 Drawing Sheets

(56) References Cited

U.S. PATENT DOCUMENTS

| | | | | |
|---|---|---|---|---|
| 2012/0065549 A1* | 3/2012 | Shelhamer | ............... | A61B 5/11 |
| | | | | 600/595 |
| 2013/0169532 A1 | 7/2013 | Jahnke | | |
| 2015/0212576 A1* | 7/2015 | Ambrus | ................. | G06F 3/013 |
| | | | | 345/156 |
| 2016/0007849 A1* | 1/2016 | Krueger | ................. | A61B 3/113 |
| | | | | 600/301 |

OTHER PUBLICATIONS

Shibata, T. et al.; Biomimetic Gaze Stabilization based on Feedback-Error-Learning with Nonparametric Regression Networks.
Extended EP Search Report for Application No. 16195389.8-1972 dated May 18, 2017.
EP Examination Report for Application No. 16195389.8-1972 dated Oct. 16, 2017.

* cited by examiner

METHODS OF VESTIBULO-OCULAR REFLEX CORRECTION IN DISPLAY SYSTEMS

TECHNICAL FIELD

The exemplary embodiments described herein generally relate to aircraft or moving vehicle operations and more particularly to displaying images of objects in a manner that corrects for the vestibulo-ocular reflex (VOR) response.

BACKGROUND

It is beneficial for a pilot to be aware of the surroundings by looking outside the cockpit windows while still monitoring the aircraft operational status. More generally, in any type of vehicle operations, it is beneficial for the operator to have enhanced situational awareness. Returning to the example of aircraft operations, traditionally, pilots have relied on the cockpit display screens which are fixed in locations and orientations relative to the pilot's seat. Even with the most recent head-up display (HUD) avionics that allow the pilot looking up while still receiving the electronic information from the avionics display units, when the pilot turns his/her head away from the location of the avionics display units, the flight information is not provided for their attention. More generally, in any vehicle operation where the operators attention needs to be focused on a display unit, even momentary movement of the head away from that display may result in missed information.

As the operation of vehicles becomes more complex, such as the aforesaid example of airplanes, it is preferable that the vehicle operator, e.g., the flight crew, be attentive and receives information in a timely and portable manner to ensure proper operation. One means for providing portable information is a head-mounted display (HMD) system. A head-mounted display system is a type of head-worn display system that uses a visor, a helmet, a goggle, or other head worn mount to place a display in front of one or both eyes. Typically, the head-mounted display includes a semi-transparent optical combining element upon which the display symbology is presented. The source of the symbology may be a liquid crystal display (LCD), liquid crystal on silicon (LCoS) display, or organic light emitting diode (OLED) display. The combining element allows the information presented on the HMD display to be superimposed on the visible scene and change as the vehicle operator moves his/her head around. Because this HMD system is head worn, there are some distinctive human body and vision system coupling characteristics that are preferably addressed. One of those is the human vestibulo-ocular reflex (VOR).

The normal VOR response is a compensatory eye movement that counters head movement when the human neural system detects motion of the head in space. For instance, rotating the head on horizontal plane to the right will induce the eye rotating left relative to the head coordinate frame to stabilize the visual axis of the gaze and keep the image fixed on the retina during the head motion. Moreover, this eye motion due to the VOR is not an exact inverse of the head motion due to the dynamic effects from the neural sensors and oculomotor nucleus response.

In current practice of HMD devices with synthetic vision image processing, images are usually compensated for the sensed head motion without dynamic compensation of the eye VOR effects. That is, the displayed image is shifted to reflect that the eye gaze is changing the direction when head moves and the eye gaze is usually assumed aligned the same as the head facing direction in the current practice of HMD design. In reality, the eye motion due to the involuntary vestibulo-ocular reflex is not aligned with the head motion, nor is it aligned with the pure inverse of the head motion. Without dynamically compensating the eye VOR effects, the resulting images may be unreadable to the human operator in a vibrating environment, such as operation of the vehicle over uneven terrain, or operation of an aircraft in a turbulent environment.

Therefore, it would be desirable to incorporate the eye VOR compensation to enhance the performance of the image stabilization and tracking design on an HMD device, especially when used in a high vibration environment. Furthermore, other desirable features and characteristics of the exemplary embodiments will become apparent from the subsequent detailed description and the appended claims, taken in conjunction with the accompanying drawings and the foregoing technical field and background. Thus, it will be appreciated that even though the exemplary applications utilizing the VOR compensation in this disclosure are related to head-mounted display systems, this disclosure can be applied to any image display system used in a high vibration or changing environment by incorporating the VOR compensation in the image processing to enhance the cognition of the display information.

BRIEF SUMMARY

A method for displaying images on a head-mounted display (HMD) device that compensates for a user's vestibulo-ocular reflex (VOR) response includes the steps of generating a first image and displaying the first image on the HMD display device, sensing an angular motion of the HMD display device, and based on the sensed angular motion of the HMD display device, estimating an angular motion of an eye of the user. The step of estimating comprises: using an eye angular VOR motion prediction mathematical model, generating a predicted eye position due to VOR effects, and using an eye angular position tracking mathematical model, correcting the predicted eye position after the head motion has subsided. Further, the method includes generating a second, subsequent image, as part of a continuous stream of images, based on the first image and based on the corrected, predicted eye position and displaying the second image on the HMD display device.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
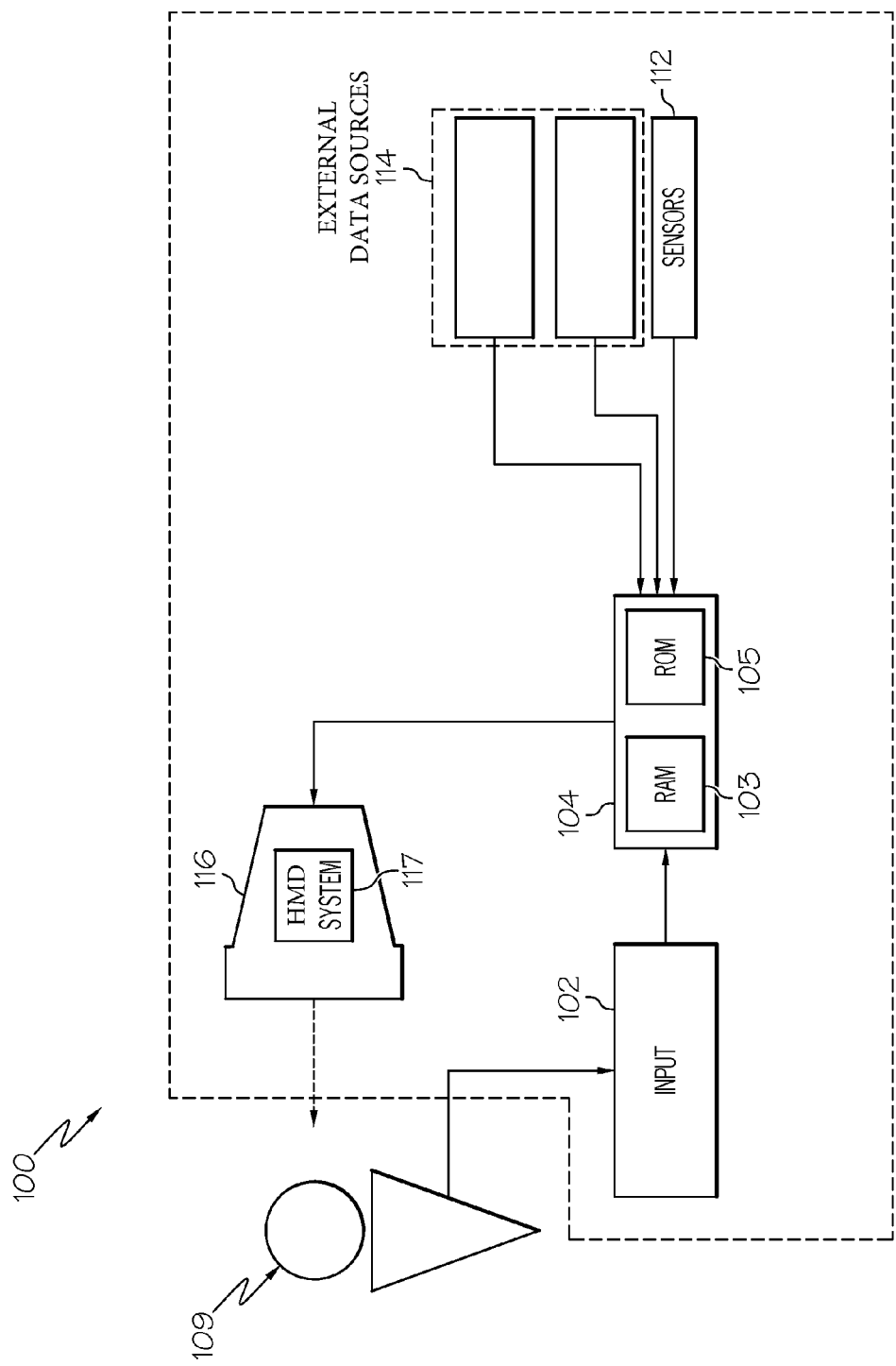
FIG. 1 is a functional block diagram of a flight display system.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

INTRODUCTION

The present disclosure broadly provides a solution to compensate for the effects of the VOR for a synthetic vision or other image presentation used in head-mounted display devices. More broadly, as noted initially above, the present disclosure is not limited to use in HMD devices, but rather will find application in any image display system used in a high vibration or changing environment by incorporating the VOR compensation in the image processing to enhance the cognition of the display information.

More specifically, the present disclosure provides an algorithm to predict the eye rotational motion due to angular VOR effects and enables the eye motion to track the stationary image displayed on the HMD device after head motion has stopped. The architecture of the present disclosure includes, among other things: 1) an eye angular VOR (aVOR) motion prediction mathematical model, and 2) an eye angular position (defined in the head coordinate frame) tracking mathematical model to align eye position with the reversed (i.e., from the perspective of facing to) head position after the VOR has occurred and head motion has subsided.

A brief overview of each of elements 1) and 2) is provided in the following few paragraphs, followed thereafter by a description of the HMD system and the implementation of the elements 1) and 2) therewith as set forth in the Figures. First, with regard to element 1), the eye angular VOR motion prediction model, a dynamic pseudo-inverse transfer function is developed with tunable time delays and tunable forward gains to represent the human eye oculomotor mechanism and counter reflex during the head motion. A feedback controller with the eye angular position feedback loop is designed to mitigate the drift of the eye position from the head position. The model utilizes three angular rates and positions of the head motion for three axes angular eye VOR motion. The outputs of this model are the predicted eye angular position defined in the head coordinate induced by the VOR. Then, the delta eye (angular) position due to VOR is generated as the difference between the predicted eye angular position due to VOR and the reversed head position.

Second, with regard to element 2), the eye angular position tracking model enables eye tracking of the head's position after VOR effects are diminished. It is designed to reduce the delta eye position to zero after the detection of relatively stationary head motion. Thus, the final eye position is aligned with the head position after the head's motion is stopped. Equivalently, this tracking feature enables the eye motion to track the stationary image as the displayed image is shifted with the reversed head position. This tracking model is also designed with logic to reject the controller noise jittering. In addition, this model allows for tuning VOR gain and delay effects by a particular human operator, and thus the predicted eye motion due to VOR can be adjusted and thus dynamically correlated with the head and eye motion for different human VOR responses.

With regard to the disclosed VOR compensation in a display system, techniques and technologies may be described herein in terms of functional and/or logical block components, and with reference to symbolic representations of operations, processing tasks, and functions that may be performed by various computing components or devices. Such operations, tasks, and functions may be referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. Though the method and system of the exemplary embodiments may be used in any type of mobile vehicle, for example, automobiles, ships, and heavy machinery, any type of non-vehicle applications, for example, surgery, machinery and building maintenance, telerobotics and other remote viewing, and any type of space application including vehicle and suit mounted, the use in an aircraft system is described as an example.

Generally, the exemplary embodiments described herein include a head-mounted display device that allows the operator of a vehicle, such as the pilot of an aircraft, to see conformal video images of the actual images outside of the vehicle or aircraft while airborne or while on the ground. A HMD head tracking system provides a left to right range of motion, for example, 360 degrees, for visual scanning. Graphics generated for display tracks to the pilot's head movement. Input from, for example, a gimbaled head tracking camera, an array of fixed sensors, or a virtual or synthetic environment created from data, gives the operator/pilot the ability to scan the sky, landscape, or runway/taxiway for objects. The vehicle's attitude (orientation) may be determined from inertial sensors, accelerometers, compasses, and air data sensors. The HMD system processes the actual video images created by a camera, sensors, or synthetically from stored data, for example.

Referring to FIG. 1, a generalized, exemplary display system 100 includes a user interface 102, a processor 104, sensors 112, external data sources 114, and one or more display devices 116 (including the HMD system 117 subsequently discussed in more detail). The user interface 102 is in operable communication with the processor 104 and is configured to receive input from an operator 109 and, in response to the user input, supplies command signals to the processor 104. In the depicted embodiment, the processor 104 includes on-board RAM (random access memory) 103, and on-board ROM (read-only memory) 105. The program instructions that control the processor 104 may be stored in either or both the RAM 103 and the ROM 105. No matter how the processor 104 is specifically implemented, it is in operable communication with the display devices 116, and is coupled to receive various types of motion data from the sensors 112, and various other vehicle data from the external data sources 114. The processor 104 is configured to supply appropriate display commands to the display devices 116. The display devices 116, in response to the display commands, selectively render various types of textual, graphic, and/or iconic information. The sensors 112 may be implemented using various types of inertial sensors, systems, and or subsystems, now known or developed in the future, for supplying various types of motion data, for example, representative of the state of the vehicle including vehicle speed, heading, altitude, and attitude.

It will be appreciated that the display devices 116 may be implemented using any one of numerous known display devices suitable for rendering textual, graphic, and/or iconic information in a format viewable by the operator 109. Non-limiting examples of such display devices include various flat panel displays such as various types of LCD (liquid crystal display), TFT (thin film transistor) displays, and projection display LCD light engines. The display devices 116 may additionally be implemented as a panel mounted display, or any one of numerous known technologies.

Figure 2:
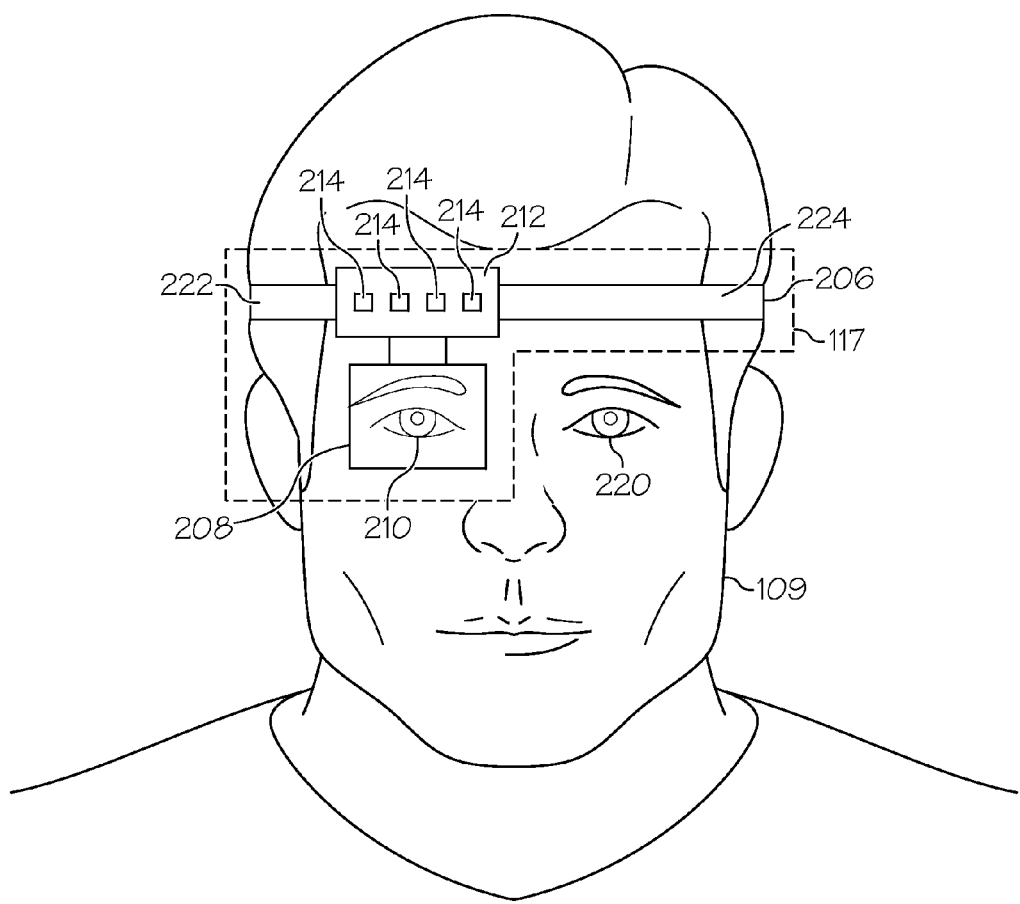
FIG. 2 is an exemplary embodiment of a HMD system.

As previously noted, the display devices 116 include a HMD display system 117. There are many known HMD systems. One known exemplary embodiment is described in commonly-assigned U.S. Pat. No. 8,552,850, which is hereby incorporated in its entirety by reference. The embodiment shown in FIG. 2 of this application, includes the operator 109 of a vehicle, such as a flight crew member of an aircraft, wearing an HMD display system 117. The HMD display system 117 includes a headband 206 coupled to a HMD display 208, which preferably is semi-transparent. When correctly worn by the operator 109, the HMD display 208 is placed in the line of sight of the right eye 210 at a predetermined distance from the right eye 210. In this manner, information can be presented to the operator 109 on the HMD display 208 superimposed on the visible scene beyond, for example, the controls and other items inside the cockpit and/or the outside view through the window of the cockpit. Light emitting diodes (LEDs) 214 are located on a portion 212 of the headband 206 to sense a direction the head of the operator 109 is facing (e.g. turned up, turned down, turned toward one portion of a cockpit or another portion) at any point in time in order to present appropriate information on the HMD display 208. Other systems for tracking head movement include cameras or emitters on the headband, or the tracking system may be magnetic or inertial rather than optical. In this manner, the operator's head direction at any point in time can be sensed for generation and presentation of an appropriate transparent view including conformal graphics and/or other information on the HMD display 208. The configuration of the HMD display system 117 is not limited to the device shown in FIG. 2. For example, while the HMD display system 117 is a monocular HMD display system, a binocular HMD display system could also be employed in the present embodiment.

Figure 3:
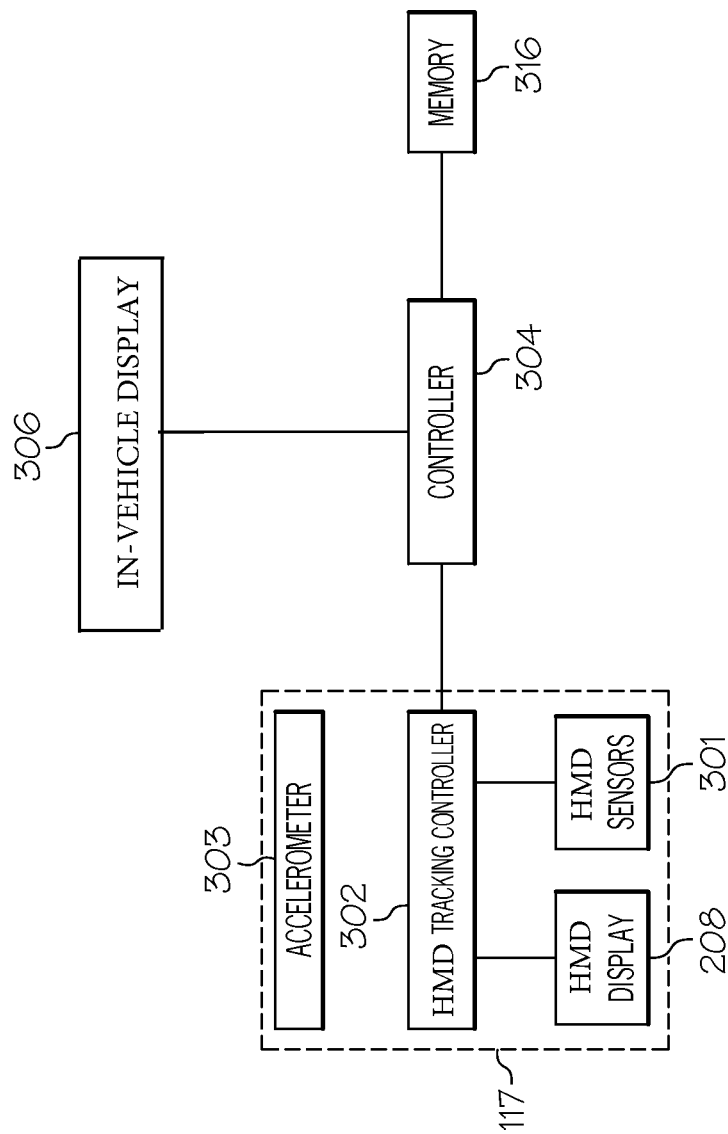
FIG. 3 is a functional block diagram of the HMD system of FIG. 2.

FIG. 3 depicts a block diagram of a system for vehicle operation in accordance with the present embodiment. The HMD display system 117 includes an HMD display 208, the HMD sensors 301 an HMD tracking controller 302 and an optional inertial measurement unit (IMU) 303. The HMD tracking controller 302 receives signals from the HMD sensors 301, such as cameras (not shown), and generates signals which are provided to the HMD display 208. The signals present appropriate information on the HMD display 208 for generating the view of conformal graphics or other information for presentation to the operator 109.

The HMD tracking controller 302 also generates focus data corresponding to the direction of the head of the operator 109 in response to the information monitored by the HMD sensors 301. Such information may include whether the operator's 109 head is turned outward toward the window (not shown) and in which direction, whether it is turned at the in-vehicle displays 306, or whether it is turned at some other point of interest. The HMD tracking controller 302 is coupled to a controller 304 for providing the focus data corresponding to the head direction of the operator 109. The focus data (e.g., the operator head tracking data resulting from monitoring the position and orientation of the HMD display system 117) is utilized by the controller 304 in presenting conformal images. Referring to the background landscape, the conformal images are loaded and the actual environment is displayed. Other information, such as vehicle navigation and performance information, is stationary on the display, regardless of the direction in which the operator wearing the HMD display system 117 is turned.

Eye Angular VOR Motion Prediction Mathematical Model

As previously noted, for the eye angular VOR motion prediction model, a dynamic pseudo-inverse transfer function 731 is developed with tunable time delays and tunable forward gains to represent the human eye oculomotor mechanism and counter reflex during the head motion. A feedback controller 730 with the eye angular position as feedback signal is designed to mitigate the drift of the eye position from the head position. It utilizes three angular rates and positions of the head motion for three axes angular eye VOR motion. The outputs of this model are the predicted eye angular position defined in the head coordinate induced by the VOR. Then, the delta eye (angular) position due to VOR is generated as the difference between the predicted eye angular position due to VOR and the reversed head position. A background understanding of this type of model may be gained from T. Shibata et al., "Biomimetic Gaze Stabilization based on Feedback-Error-Learning with Nonparametric Regression Networks," Neural Networks, Vol. 12, Iss. 2, March 2001, pp. 201-216, the contents of which are herein incorporated by reference in their entirety.

Figure 4:
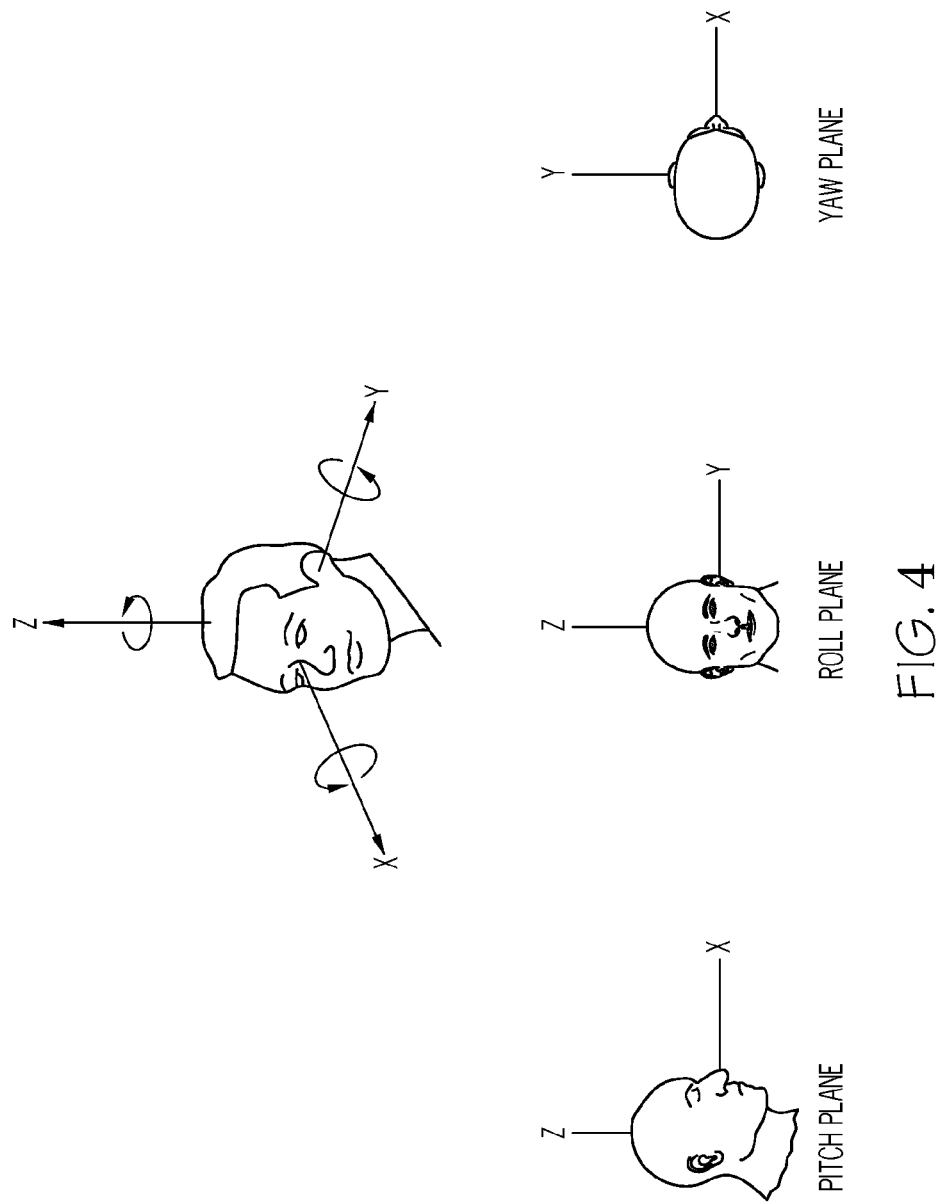
FIG. 4 provides a reference coordinate system.

The model operates in all three axes of movement, namely the x, y, and z axes. It is thus appropriate at this time to introduce FIG. 4, which provide an illustration of these three axes with regard to a user's head, for reference in the discussion of the eye angular VOR motion prediction model and the eye angular position tracking model, as set forth in greater detail below. As shown in FIG. 4, the z-axis runs vertically through the user's head, the y-axis runs through the sides of the user's head, and the x-axis runs through the front and back of the user's head. The angular accelerations, velocities, and positions of the head and eye positions with regard to the respective models described below will be provided on the basis of this coordinate frame. For example, The Pitch Plane is defined to rotate about the y axis; its corresponding head rotational rate signal is termed as input signal H_Ry_rate $702y$ in FIG. 7.

Figure 5:
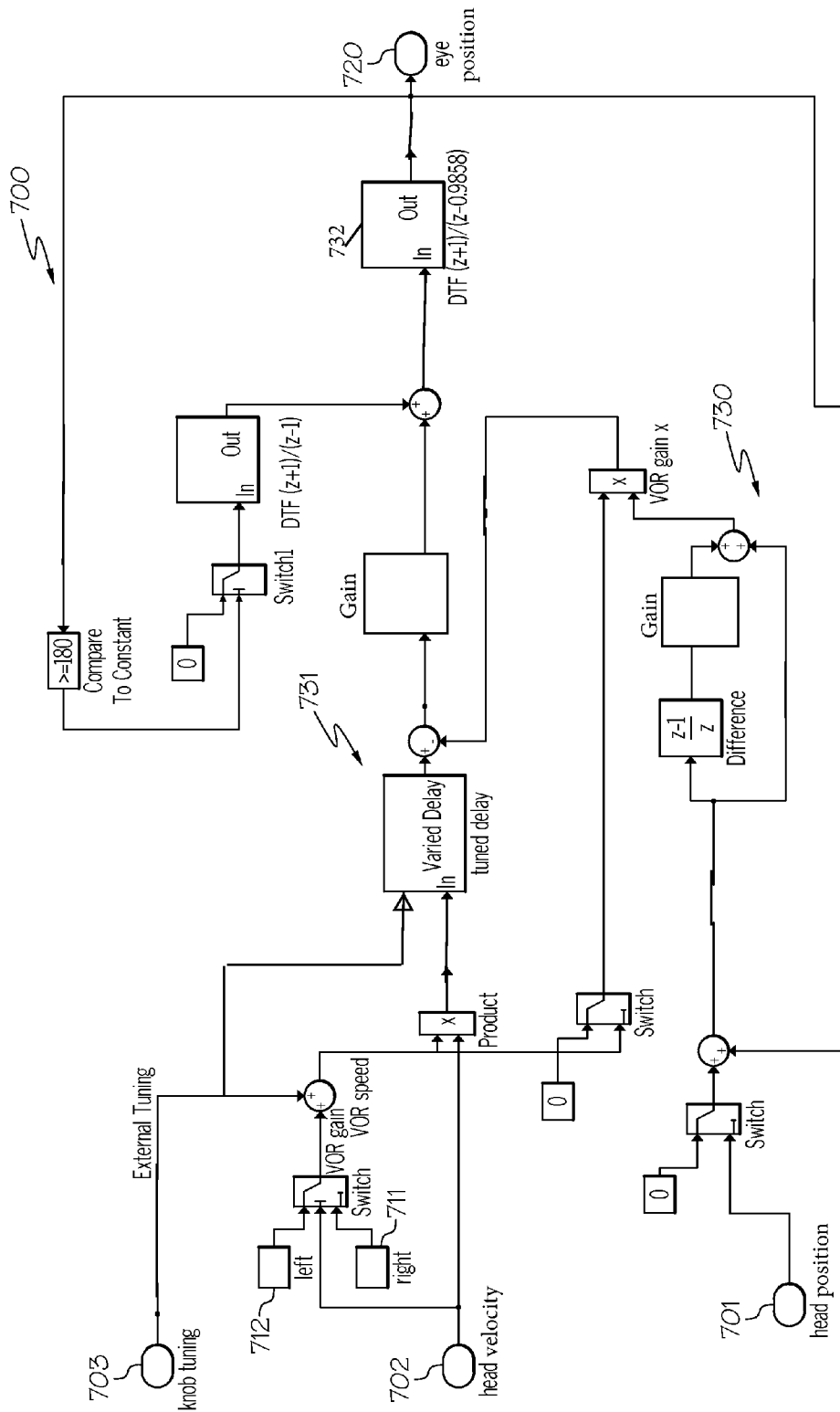
FIG. 5 illustrates an exemplary eye angular VOR motion prediction model in one axis.

The eye angular VOR motion prediction mathematical model 700 is illustrated in FIG. 5. FIG. 5 displays the mathematical model for only one axis for simplicity. However, it should be noted that the model is extended in all three axes, using the same base model, but with different numerical parameters, as will be described in greater detail below and as is set forth more particularly in FIG. 7.

The eye angular VOR motion prediction mathematical model uses as its inputs the user's head position 701 (defined in each of the three axes, although FIG. 5 as noted above shows the input for only one axis), the user's head velocity 702 (defined in each of the three axes), and a tuning parameter referred to as a tuning "knob" 703 (again, defined in each of the three axes). Also provided are VOR speed gains for each direction of rotation (711, 712) in each of the three axes. This is the gain to attenuate the sensed head angular rate for the VOR correction effect. Each axis has different VOR speed gain baselines for different head rotational directions (711, 712). Merely as one non-limiting example, the baseline VOR speed gain may be about 0.97 pitch up and about 1.10 pitch down, in one embodiment. Each gain can have a tunable bias, controlled by the tuning knob 703. Merely as one non-limiting example, the bias may be about +/−0.09, in one embodiment. The following described the effect of knob tuning on the gain, for each axis and for each direction of rotation in each axis: The range of knob is scaled differently for each axis. In one non-limiting example, the maximum of the knob tuning is interpreted as about 0.09 bias for pitch axis, but about 0.07 bias for yaw and roll axis. When the knob is zero centered, the baseline gain and default delay values are used. When the knob is turned right, gain is increased with positive bias from the baseline, and the result is that delay time is reduced from the baseline. Alternatively, when the knob is turned to the left, gain is reduced with negative bias from the baseline and delay time is increased from the baseline. The tunable gains are provided to compensate for different VOR responses which vary from person to person.

The eye angular VOR motion prediction mathematical model produces as its outputs a predicted eye position 720 in each of the three axes, as shown in FIG. 5 for one axis. These outputs are used as one of the inputs for the eye angular position tracking mathematical model, as described in greater detail below.

Eye Angular Position Tracking Mathematical Model

As previously noted, the eye angular position tracking model enables the eye tracking the head position after VOR effects are diminished. It is designed to reduce the delta eye position to zero after the detection of static head motion. Thus, the final eye position is aligned with the head position after the head motion is stopped. Equivalently, this tracking feature enables the eye motion to track the stationary image as the eye angular position is aligned with the head position. This tracking model is also designed with logic to reject the controller and sensor noise.

Figure 6:
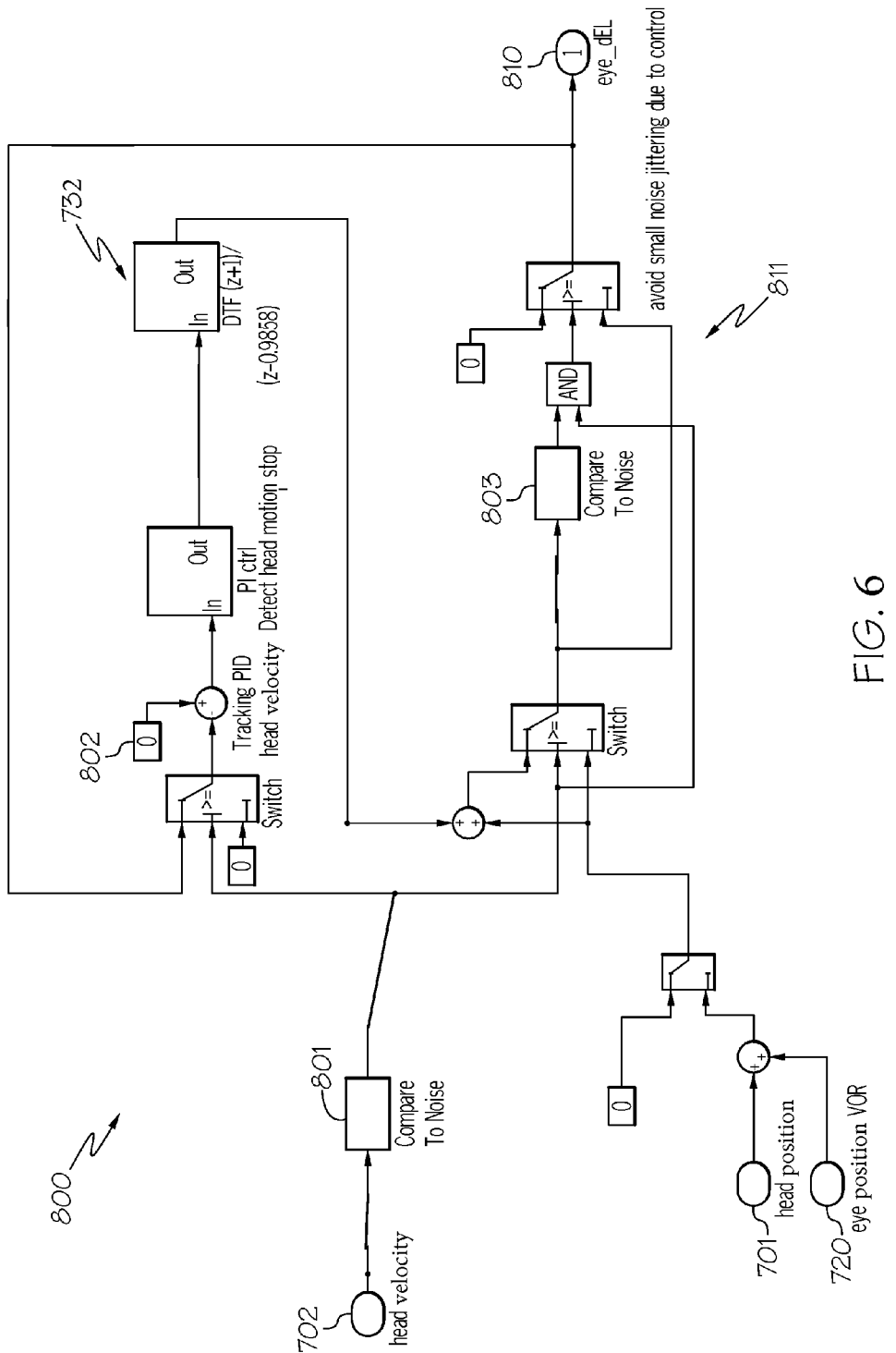
FIG. 6 illustrates an exemplary eye angular position tracking model in one axis.

The eye angular position tracking mathematical model 800 is illustrated in FIG. 6. FIG. 6 displays the mathematical model for only one axis for simplicity. However, it should be noted that the model is extended in all three axes, using the same base model, but with different numerical parameters, as will be described in greater detail below and as is set forth more specifically in FIG. 7.

The eye angular position tracking mathematical model uses as its inputs the user's head position 701 (defined in each of the three axes, although FIG. 6 as noted above shows the input for only one axis), the user's head velocity 702 (defined in each of the three axes), and the predicted eye position 720 from the eye angular VOR motion prediction mathematical model (again, defined in each of the three axes). As further illustrated, parameter 801 is a parameter for detecting static head motion, wherein it is assumed that the rate being less than a predetermined (based on particular implementation) number of degrees per second means that the head motion has stopped.

As with FIG. 5, the model shown in FIG. 6 includes the oculomotor plant design parameters 732, the feedback control loop with the delta input being set to "0" (802) for the static motion condition. Moreover, the model 800 contains control parameters 811 to mitigate the effects of motion jitter. For example, as noted above, an IMU signal, in a real vibratory environment, contains noise which causes a rapid image change even after the head motion is either slowed or stopped. Then, due to the unintended signal noise which is usually high frequency and small magnitude, the HMD system misinterprets the measured signal as the actual head motion and adjusts the display image accordingly, resulting in image jitter. If the magnitude of the rapid movement (acceleration) is below a threshold, the conformal image is still, thereby preventing a jerky or jittery motion of the conformal images that would be generated from the actual video images received during the head movement, and may be stopped when rapid head movement is detected with small magnitude. Any threshold value 803 may be selected as desired, which in the non-limiting, illustrated embodiment is about 0.02.

The eye angular position tracking mathematical model produces as its output a change ("delta") in eye position 810 to reduce the eye position as determined in FIG. 5. An integrated mathematical model based on the outputs of the models shown in FIGS. 5 and 6 produces a final result, which allows the HMD system to correct the display image for the VOR effects, as described below in FIG. 7.

Integration of the Mathematical Models

Figure 7:
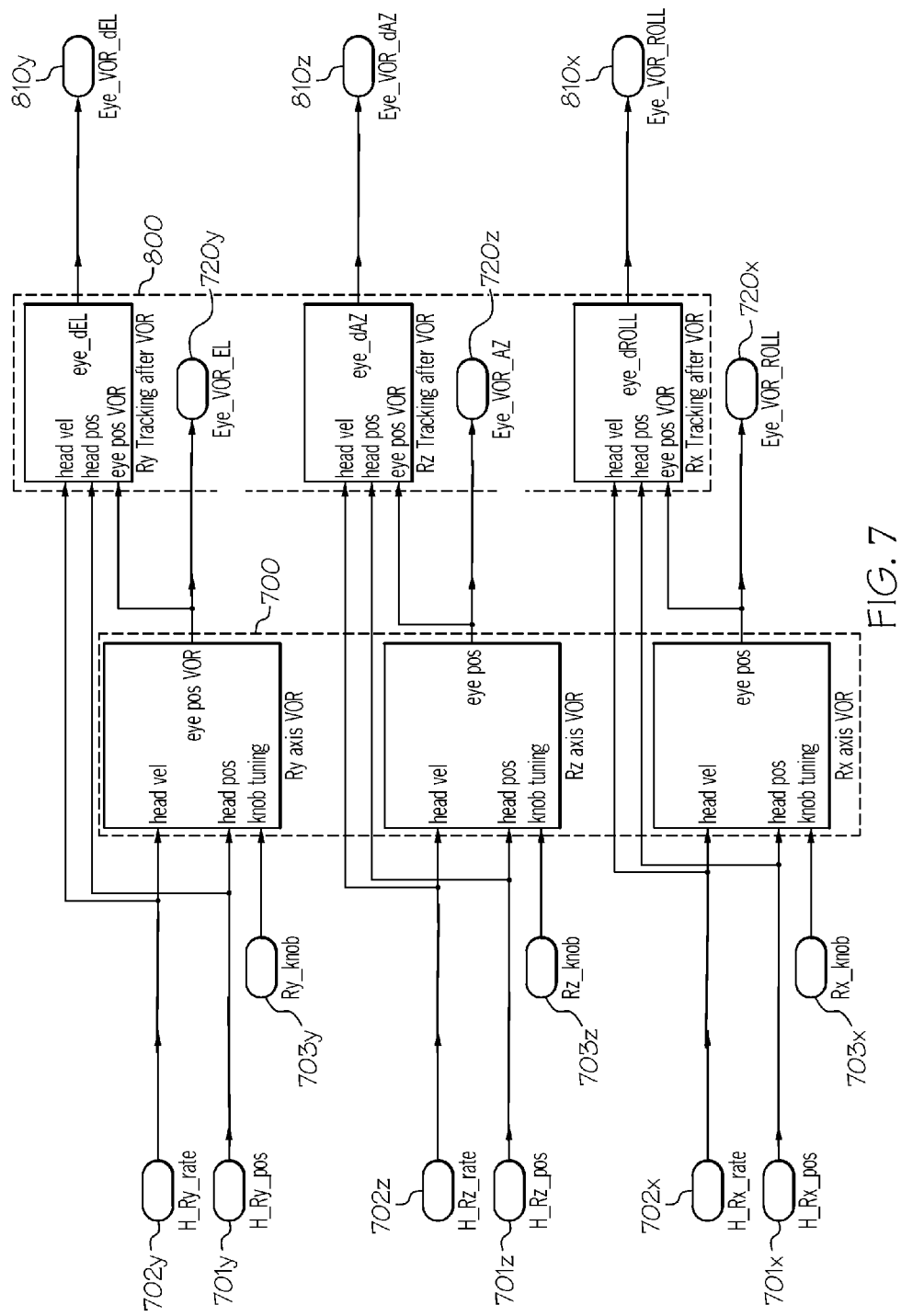
FIG. 7 illustrates an integration method of both the models of FIGS. 5 and 6 in three axes.

FIG. 7 illustrates a mathematical model that shows the combined inter-workings of the eye angular VOR motion prediction mathematical model 700 of FIG. 5 and the eye angular position tracking mathematical model 800 of FIG. 6. In FIG. 7, each of the three axes are illustrated, with inputs 701x, y, z for the head position and 702x, y, z, for the head velocity. Tuning knobs 703x, y, z are also illustrated. The results are predicted VOR eye positions 720x, y, z, which are corrected by delta eye position 810x, y, z, for a final determined eye position, which is used to update the HMD display.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims.

What is claimed is:

1. A method for displaying images on a head-mounted display (HMD) device that is worn by an operator and that compensates for the operator's vestibulo-ocular reflex (VOR) response, the method comprising the steps of:

generating a first image and displaying the first image on the HMD display device, wherein the first image is conformal to an environment external to the operator and is based on a first head direction in x, y, z coordinates of the operator's head;

sensing a rotational rate of the operator's head in x, y, z coordinates as the operator's head rotates to a second head direction in x, y, z coordinates that is different than the first head direction;

based on the sensed rotational rate of the operator's head, estimating an angular motion of an eye of the operator, wherein the step of estimating comprises, using an eye angular VOR motion prediction mathematical model, generating a predicted eye angular position due to VOR effects, wherein the eye angular VOR motion prediction mathematical model uses as its inputs (1) the first head direction in x, y, z coordinates of the operator's head, (2) the sensed rotational rate of the operator's head, and (3) a tunable, numerical parameter that compensates for the VOR response that is specific to the operator, wherein the eye angular VOR motion prediction mathematical model operates on inputs (1)-(3) by applying a pseudo-inverse transfer function having a tunable time delay, a tunable forward gain, and a feedback controller, and wherein the eye angular VOR motion prediction mathematical model produces as its output the predicted eye angular position in x, y, z coordinates due to VOR effects; and generating a second, subsequent image, as part of a continuous stream of images, based on the predicted eye angular position, wherein the second, subsequent image is conformal to an environment external to the operator corresponding to the predicted eye angular position, and displaying the second, subsequent image on the HMD display device.

2. The method of claim 1, further comprising:

based on the predicted eye angular position due to VOR effects, calculating an eye position deviation from the second head direction in x, y, z coordinates; and after generating the second, subsequent image, using an eye angular position tracking mathematical model, reducing the eye position deviation from the second head direction in x, y, z coordinates over time, and thereafter, generating a third, subsequent image, as part of the continuous stream of images, wherein the third, subsequent image is conformal to an environment external to the operator corresponding to the second head direction in x, y, z coordinates with no correction for eye position deviation.

\* \* \* \* \*